United States Patent
Bell et al.

(10) Patent No.: US 6,242,019 B1
(45) Date of Patent: Jun. 5, 2001

(54) TASTE MODIFIED HARD CONFECTIONERY COMPOSITIONS CONTAINING FUNCTIONAL INGREDIENTS

(75) Inventors: Anthony John Bell, Andover; Wendy Deisseroth, Flanders; Jean-Marie Jordan, Springfield, all of NJ (US)

(73) Assignee: Warner-Lambert Company, Morris Plains, NJ (US)

(*) Notice: Subject to any disclaimer, the term of this patent is extended or adjusted under 35 U.S.C. 154(b) by 0 days.

(21) Appl. No.: 09/126,480

(22) Filed: Jul. 30, 1998

Related U.S. Application Data

(60) Provisional application No. 60/055,647, filed on Aug. 14, 1997.

(51) Int. Cl.[7] .............................. A61K 9/26; A61K 9/42; A23L 1/304
(52) U.S. Cl. ................... 426/74; 426/97; 426/99; 426/660; 424/440; 424/476; 424/498; 424/502
(58) Field of Search .................. 426/72, 74, 97, 426/99, 660, 440; 424/476, 498, 502

(56) References Cited

U.S. PATENT DOCUMENTS

| | | | | |
|---|---|---|---|---|
| 1,765,867 | * | 6/1930 | Granger et al. | 99/16 |
| 1,927,640 | * | 9/1933 | Granger et al. | 99/16 |
| 2,375,279 | * | 5/1945 | Buxton et al. | 99/11 |
| 2,828,206 | * | 3/1958 | Rosenberg | 99/2 |
| 3,647,480 | * | 3/1972 | Cermak | 99/140 R |
| 3,798,338 | * | 3/1974 | Galle | 426/307 |
| 3,867,556 | * | 2/1975 | Darragh | 426/98 |
| 3,879,511 | * | 4/1975 | Goodhart et al. | 424/35 |
| 3,928,633 | * | 12/1975 | Shoat et al. | 426/96 |
| 3,949,094 | * | 4/1976 | Johnson et al. | 426/99 |
| 3,950,545 | * | 4/1976 | Hayward et al. . | |
| 3,976,794 | * | 8/1976 | Johnson et al. | 426/103 |
| 3,992,556 | * | 11/1976 | Kovacs et al. | 426/72 |
| 4,102,806 | * | 7/1978 | Kondo et al. | 252/316 |
| 4,117,176 | | 9/1978 | Taylor et al. . | |
| 4,182,778 | * | 1/1980 | Hall et al. | 426/72 |
| 4,339,432 | | 7/1982 | Ritchey et al. . | |
| 4,382,924 | * | 5/1983 | Berling et al. | 424/180 |
| 4,416,867 | | 11/1983 | Ritchey et al. . | |
| 4,425,325 | | 1/1984 | Ritchey et al. . | |
| 4,452,821 | * | 6/1984 | Gergely | 426/5 |
| 4,469,674 | * | 9/1984 | Shah et al. | 424/52 |
| 4,684,528 | | 8/1987 | Godfrey . | |
| 4,695,463 | * | 9/1987 | Yang et al. | 424/440 |
| 4,698,232 | | 10/1987 | Sheu et al. . | |
| 4,758,439 | | 7/1988 | Godfrey . | |
| 4,778,676 | * | 10/1988 | Yong et al. | 424/79 |
| 4,797,288 | * | 1/1989 | Sharma et al. | 424/476 |
| 4,832,971 | * | 5/1989 | Michnowski . | |
| 4,843,089 | | 6/1989 | Shaw et al. . | |
| 4,865,851 | | 9/1989 | James et al. . | |
| 4,871,558 | * | 10/1989 | Tackikawa et al. | 426/99 |
| 4,933,183 | * | 6/1990 | Sharma et al. | 424/439 |
| 4,935,247 | | 6/1990 | Marttila et al. . | |
| 4,966,779 | * | 10/1990 | Kirk | 426/72 |
| 5,000,944 | | 3/1991 | Prencipe et al. . | |
| 5,002,970 | | 3/1991 | Eby, III . | |
| 5,013,716 | * | 5/1991 | Cherukuri et al. | 514/23 |
| 5,059,416 | * | 10/1991 | Cherukuri et al. | 424/48 |
| 5,073,389 | * | 12/1991 | Wienecke . | |
| 5,095,035 | | 3/1992 | Eby, III . | |
| 5,204,029 | * | 4/1993 | Morgan et al. | 264/4.4 |
| 5,230,913 | * | 7/1993 | Klemann | 426/97 |
| 5,320,848 | | 6/1994 | Geyer et al. . | |
| 5,409,905 | * | 4/1995 | Eby, III | 514/23 |
| 5,494,681 | | 2/1996 | Cuca et al. . | |
| 5,498,447 | | 3/1996 | Nishii et al. . | |
| 5,549,917 | * | 8/1996 | Cherukuri et al. | 426/96 |
| 5,554,380 | * | 9/1996 | Cuca et al. | 424/441 |
| 5,578,336 | * | 11/1996 | Monte | 426/72 |
| 5,589,194 | * | 12/1996 | Tsuei et al. | 424/497 |
| 5,597,844 | | 1/1997 | Chauhan et al. . | |
| 5,635,200 | | 6/1997 | Douglas et al. . | |
| 5,637,344 | * | 6/1997 | Carpenter et al. . | |
| 5,707,670 | * | 1/1998 | Mechansho et al. | 426/73 |
| 5,897,891 | * | 4/1999 | Godfrey | 426/74 |

FOREIGN PATENT DOCUMENTS

| | | |
|---|---|---|
| 251542 | 7/1988 | (EP) . |
| 0732064 | 9/1996 | (EP) . |
| 7242568 | 9/1995 | (JP) . |
| 8333243 | 12/1996 | (JP) . |
| 9405260 | 3/1994 | (WO) . |
| 9412180 | 6/1994 | (WO) . |
| 9610993 | 4/1996 | (WO) . |
| 9703656 | 2/1997 | (WO) . |

* cited by examiner

*Primary Examiner*—Cynthia L. Nessler
(74) *Attorney, Agent, or Firm*—Linda A. Vag

(57) ABSTRACT

The present invention provides improved confectionery compositions which have a substantial reduction in the unpleasant organoleptic sensations associated with the release of functional ingredients from the confection in the oral cavity. The confectionery composition comprises a confectionery base, a functional ingredient which is a botanical or a mineral or a mineral salt having an unpleasant mouthfeel, and from about 0.5% to about 5.0% by weight of the composition of one or more fats, said amount being effective to suppress the unpleasant mouthfeel of the functional ingredient. For botanicals the confectionery composition is a hard boiled candy composition or a hard gum composition and the fat is one or more partially hydrogenated vegetable oils or saturated fats. For minerals or their salts the confection is a hard boiled candy composition and the fat is one or more partially hydrogenated vegetable oils. As a result of the present invention, improved hard confectionery products are provided which have a substantial reduction in the unpleasant organoleptic sensations associated with the functional ingredients upon release of the functional ingredient from the confection in the oral cavity.

9 Claims, No Drawings

TASTE MODIFIED HARD CONFECTIONERY COMPOSITIONS CONTAINING FUNCTIONAL INGREDIENTS

This application claims priority from provisional application Ser. No. 60/055,647, filed Aug. 14, 1997.

BACKGROUND OF THE INVENTION

1. Field of the Invention

This invention concerns the use of fats to suppress the unpleasant mouthfeel of functional ingredients in hard confectionery compositions. More specifically it concerns the use of saturated fats or partially hydrogenated vegetable oils to suppress the unpleasant mouthfeel of botanicals in hard boiled candy or hard gum compositions. It further concerns the use of partially hydrogenated vegetable oils to suppress the unpleasant mouthfeel of minerals and their salts in hard boiled candy compositions.

2. Background of the Invention

Functional ingredients, also known as nutraceuticals, are those food ingredients which generally provide therapeutic benefits when consumed in the diet. A drawback with the use of functional ingredients such as the botanicals, minerals and mineral salts, is their unpleasant mouthfeel when orally ingested, usually an unpleasant tingling sensation or astringency.

The art teaches methods for masking the unpleasant mouthfeel of the mineral zinc. U.S. Pat. Nos. 4,425,325, 4,758,439, 4,684,528, 4,339,432 and 4,416,867 all teach reduction of the astringency of zinc in oral compositions by addition of glycine or other select amino acids. EP 0,251,542 uses polyoxyethylene hydrogenated castor oil (polymerized castor oil) to mask zinc and U.S. Pat. No. 5,002,970 uses anethole. U.S. Pat. No. 5,000,944 teaches reduction of astringency of zinc by dissolving zinc salt in an aqueous polyphosphate solution. U.S. Pat. No. 5,095,035 uses a sweet pharmaceutically acceptable carrier. U.S. Pat. No. 5,059,416 teaches coating zinc with a hydrophillic layer followed by a hydrophobic layer selected from fats and waxes. The resultant product is a powder or granulate.

The coating of pharmaceuticals in general with hydrophobic materials, especially lipids, with or without other materials to mask unpleasant mouthfeel, is taught in the art. These systems are generally directed toward providing coated particles of the pharmaceutical which can then be used in quick delivery formulations such as liquid suspensions, quick dissolve tablets, capsules, syrups and the like. The coatings prevent release of the pharmaceutical until it has passed from the oral cavity into the gut. U.S. Pat. Nos. 5,498,447, 4,865, 851, 5,635,200, 4,953,247, 5,597,844, 5,320,848 and 5,494,681, Japanese Patents 7242568 and 08333243, and WO Patent Publications 94/05260, 96/10993 and 97/03656 all concern these methods of masking mouthfeel and/or providing stability until the pharmaceutical reaches the gut.

Although functional ingredients have been provided in various delivery forms by those skilled in the dietary supplement and food arts, the prior art delivery forms have not satisfactorily met the consumer need to be both efficacious and have an acceptable taste for oral ingestion, particularly when delivered to the oral cavity. It would be desirable to provide the consumer with a food product, particularly with a hard confectionery product, containing functional ingredients wherein the unpleasant mouthfeel of the functional ingredient has been substantially reduced. It would be desirable to provide the consumer with a hard confectionery product which is both efficacious and have an acceptable taste.

SUMMARY OF THE INVENTION

The present invention concerns a hard boiled candy composition comprising a confectionery base, a botanical or mineral or mineral salt having an unpleasant mouthfeel, and from about 0.5% to about 5.0% by weight of the composition of one or more partially hydrogenated vegetable oils, said amount being effective to suppress the unpleasant mouthfeel of the functional ingredient. The invention further concerns a hard boiled candy composition comprising a confectionery base, a botanical having an unpleasant mouthfeel, and from about 0.5% to about 5.0% by weight of the composition of one or more saturated fats, said amount being effective to suppress the unpleasant mouthfeel of the botanical. The invention still further concerns a hard gum composition comprising a confectionery base, a botanical having an unpleasant mouthfeel, and from about 0.5% to about 5.0% by weight of the composition of one or more partially hydrogenated vegetable oils or saturated fats, said amount being effective to suppress the unpleasant mouthfeel of said botanical.

As a result of the present invention, improved hard confectionery products are provided which have a substantial reduction in the unpleasant organoleptic sensations associated with the functional ingredients upon release of the functional ingredient from the confection in the oral cavity.

DETAILED DESCRIPTION OF THE INVENTION

The invention concerns the use of fats to suppress the unpleasant mouthfeel of functional ingredients, also referred to herein as nutraceuticals, in confectionery products. By "functional ingredient" or "nutraceutical" is meant a material that offers the consumer some degree of nutritional or therapeutic benefit when consumed in the diet.

Nutraceuticals having an unpleasant mouthfeel include botanicals, minerals and mineral salts. By "botanical" is meant a substance derived from plant source, that is, from roots, leaves, bark or berries of plants, and used in the human diet. Botanicals include, but are not limited to, Echinacea, Siberian Ginseng, Ginko Biloba, Kola Nut, Goldenseal, Golo Kola, Schizandra, Elderberry, St. Johns Wort, Valerian and Ephedra. Echinacea is a preferred botanical for the practice of the present invention.

By "mineral" is meant inorganic substances, metals and the like used in the human diet. Minerals include, but are not limited to, zinc, calcium, iron and selenium. "Mineral salts" is meant to include the organic and inorganic salts of these minerals and include, but are not limited to, the gluconate, acetate, ascorbate, glycinate, citrate, chloride and sulfate. Zinc, or a zinc salt, is a preferred mineral for the practice of the present invention.

The amount of botanical, mineral or mineral salt used in the present invention may vary depending upon recommendations derived from the available scientific literature, and/or the recommended or permitted dosage for the particular agent in accordance with the guidelines of, for example, the Nutrition Labeling and Education Act of 1990 and the Dietary Supplement Health and Education Act of 1994, and the Food and Drug regulations implementing the Acts. The amount of functional ingredient present will also be governed by the constraints of the confectionery product formulation. In the practice of the present invention the hard confectionery product may contain up to 5% by weight of the botanical, mineral, or mineral salt.

The "fats" utilized by the present invention are partially hydrogenated vegetable oils and saturated fats. Partially hydrogenated vegetable oils include but are not limited to partially hydrogenated cottonseed oil, soybean oil, peanut oil, palm oil, sunflower seed oil and corn oil. The saturated fats include but are not limited to, palm kernel oil, coconut oil, cocoa butter, butter, and commercially available blends such as PARAMOUNT C (trademark of Durkee Industrial Foods).

The unpleasant mouthfeel effects typically found with botanicals, minerals and mineral salts include tingling, burning, drying, and astringency. These mouthfeel effects will generally be noted immediately upon consumption for minerals or mineral salts which have a quick mouthfeel impact. The unpleasant mouthfeel effects of botanicals, by comparison, will develop more slowly. All of these mouthfeel effects are generally found to be unpleasant and make the hard confectionery product in which they are incorporated less appealing. It has now surprisingly been found that when one or more partially hydrogenated vegetable oils of the present invention is added into the hard confectionery composition containing a botanical, mineral or a mineral salt, the unpleasant mouthfeel effects are suppressed providing a product which is more acceptable to the consumer palate. It has further been found that when one or more saturated fats of the present invention is added into the hard confectionery composition containing a botanical, the unpleasant mouthfeel effects are suppressed providing a product which is more acceptable to the consumer palate. These effects have been found with partially hydrogenated vegetable oils and saturated fats present at a level of up to 5% by weight of the hard confection, The ratio of the saturated fat or partially hydrogenated oil to the functional ingredient may vary over a broad range and still provide an effective suppression of the unpleasant mouthfeel associated with the ingredient. The ratio may vary from about 1/1 to about 1/0.1. It is preferred to use a ratio of saturated fat or partially hydrogenated vegetable oil to functional ingredient in a ratio of from 1.0/0.6 to 1.0/0.15. Further, while the amount of saturated fat or partially hydrogenated vegetable oil may be present in the hard confectionery composition in an amount of up to 5%, suitably from about 0.5% to about 5.0%, by weight of the composition, an amount in the range of from 0.5% to 3.5%, and especially from 0.75% to 3.0%, is preferred.

The preferred product uses a saturated fat or partially hydrogenated vegetable oil having a melting point of from about 95° F.(35 C.°) to about 150° F. (65.5° C.), i.e., solid at ambient temperature. A preferred partially hydrogenated vegetable oil is partially hydrogenated cottonseed oil. Preferred saturated fats are palm kernel oil and butter.

The confectionery compositions incorporating the nutraceuticals are referred to herein as hard confectionery compositions. A hard confectionery composition is one intended to reside in the oral cavity for a period of time while being consumed. In the practice of the present invention sugar and sugarfree hard boiled candy containing a botanical, mineral or mineral salt having an unpleasant mouthfeel, have been found to have a substantial reduction in the unpleasant organoleptic sensations associated with the nutraceutical. In the practice of the present invention, the unpleasant organoleptic sensation of hard gums containing botanicals having unpleasant mouthfeel is also effectively suppressed by a fat or oil of the present invention. Therefore, in the practice of the present invention, "hard confectionery composition" is understood to include hard boiled candy compositions containing botanicals, minerals or mineral salts and also include hard gum compositions containing botanicals.

In an aspect of the present invention therefore a saturated fat or a partially hydrogenated vegetable oil is used to suppress the unpleasant mouthfeel of a hard boiled candy containing a botanical.

In a further aspect of the present invention a saturated fat or a partially hydrogenated vegetable oil is used to suppress the unpleasant mouthfeel of a hard gum containing a botanical.

In a further aspect of the present invention a partially hydrogenated vegetable oil is used to suppress the unpleasant mouthfeel of a hard boiled candy containing a mineral or a mineral salt.

Hard boiled candy compositions generally have a candy base composed of a mixture of sugar and other carbohydrate bulking agents kept in an amorphous or glassy condition, preferably having from about 0.5% to about 3.0% moisture. The base may normally contain sugar and glucose in amounts of up to about 90% sugar and up to about 70% glucose syrup. Further ingredients such as flavoring agents, sweetening agents, acidulants, gelling agents, colorants and so forth may also be added. Hard boiled candies may also be prepared from non-fermentable sugars such as sorbitol, mannitol, xylitol, maltitol, isomalt, erythritol, hydrogenated starch hydrolysates and the like.

In the practice of the present invention it is preferred to include an emusifier in the candy formulation when higher amounts of minerals or mineral salts are incorporated. The optional use of emulsifier aids in the manufacturing process. Emulsifiers include but are not limited to diactyl tartaric acid esters of monoglycerides such as PANODAN (registered trademark of Danisco), lecithin, glycerol monostearate and glycerol mono-oleate.

Hard boiled candy may be routinely prepared by conventional methods such as those involving fire cookers, vacuum cookers, and scraped-surface cookers also referred to as high speed atmospheric cookers. Once the candy mass has been properly tempered, it may be cut into workable portions or formed into desired shapes. A variety of forming techniques may be utilized depending upon the shape and size of the final product desired. A general discussion of the composition and preparation of hard confections may be found in E. B. Jackson, Ed. "Sugar Confectionery Manufacture", 2nd edition, Blackie Academic & Professional Press, Glasgow UK, (1990), at pages 129–169.

Hard gums compositions generally are a combination of a gum solution and a boiled syrup and have a moisture content of about 4–5%. The gum solution is prepared by soaking a gum, such as gum arabic, or a mixture of the gum arabic and gelatin, in water with gentle warming until dissolved. The syrup is a sugar and glucose mixture heated to boiling in water. The boiled syrup is poured into the gum solution with gentle mixing. Flavorants and other optional ingredients such as acids, colorants, humectants and the like, may be added. Hard gums may be formed by starch molding, sugar molding or molding techniques using plastic, metal and the like or by slabbing. Hard gums are typically formed by starch molding and such techniques are well known in the art. A discussion of hard gums and molding techniques may be found in Bernard W. Minifie, "Chocolate, Cocoa, and Confectionery", 3rd edition, Chapman & Hall, New York, N.Y., (1989), at pages 584, 519; and E. B. Jackson, Ed. "Sugar Confectionery Manufacture", 2nd edition, Blackie Academic & Professional Press, Glasgow UK, (1990), at page 189.

The invention is illustrated by the following non-limiting examples.

EXAMPLES

Example 1

The following, unflavored, hard boiled candies and hard gums were prepared to illustrate the suppression of the mouthfeel effects of the nutraceuticals of the invention by a saturated fat or a partially hydrogenated vegetable oil of the invention. The compositions were prepared by conventional manufacturing techniques.

The compositions were evaluated by a professional descriptive panel as discussed further below. Formulas 1, 2, 3, 4, 5 and 6 are controls. Formulas A, B, C, D, E, F, G, H, I, and J are inventive.

| A. ECHINACEA IN A HARD BOILED CANDY | | | | | | |
|---|---|---|---|---|---|---|
| INGREDIENTS | 1 | A | B | 2 | C | D |
| GRANULATED SUGAR | 52.48 | 50.95 | 46.98 | 52.96 | 50.23 | 52.19 |
| CORN SYRUP | 42.78 | 41.53 | 38.29 | 43.17 | 40.95 | 42.54 |
| ECHINACEA | 1.74 | 1.7 | 1.71 | 0.87 | 0.84 | 0.85 |
| PALM KERNEL OIL | 0 | 2.82 | 0 | 0 | 4.98 | 0 |
| PARTIALLY HYDROGENATED COTTONSEED OIL | 0 | 0 | 10.02 | 0 | 0 | 1.42 |
| RESIDUAL MOISTURE | 3 | 3 | 3 | 3 | 3 | 3 |
| TOTAL | 100 | 100 | 100 | 100 | 100 | 100 |
| PERCENT REDUCTION IN MOUTHFEEL+ | — | 64.6 | 81.5 | — | 71.3 | 57.5 |

| B. ZINC IN A HARD BOILED CANDY | | | | |
|---|---|---|---|---|
| INGREDIENTS | 3 | E | 4 | F |
| GRANULATED SUGAR | 52.95 | 50.15 | 53.21 | 50.46 |
| CORN SYRUP | 43.17 | 40.88 | 43.38 | 41.13 |
| ZINC | 0.88 | 0.88 | 0.41 | 0.41 |
| PARTIALLY HYDROGENATED COTTONSEED OIL | 0 | 5.09 | 0 | 5 |
| RESIDUAL MOISTURE | 3 | 3 | 3 | 3 |
| TOTAL | 100 | 100 | 100 | 100 |
| PERCENT REDUCTION IN MOUTHFEEL+ | — | 15.4 | — | 22 |

| C. ECHINACEA IN A HARDGUM CANDY | | | | | | |
|---|---|---|---|---|---|---|
| INGREDIENTS | 5 | G | H | 6 | I | J |
| SUGAR | 31.54 | 28.08 | 30.57 | 31.84 | 31.35 | 30.1 |
| CORN SYRUP | 8.41 | 7.49 | 8.15 | 8.49 | 8.36 | 8.03 |
| GUM SOLUTION* | 50.82 | 45.25 | 49.26 | 51.31 | 50.52 | 48.5 |
| ECHINACEA | 1.73 | 1.69 | 1.69 | 0.86 | 0.85 | 0.85 |
| PALM KERNEL OIL | 0 | 9.99 | 0 | 0 | 1.42 | 0 |
| PARTIALLY HYDROGENATED COTTONSEED OIL | 0 | 0 | 2.83 | 0 | 0 | 5.02 |
| RESIDUAL MOISTURE | 7.5 | 7.5 | 7.5 | 7.5 | 7.5 | 7.5 |
| TOTAL | 100 | 100 | 100 | 100 | 100 | 100 |
| PERCENT REDUCTION IN MOUTHFEEL+ | — | 73.2 | 49.9 | — | 60.4 | 65.6 |

*Solution OF 53% Water & 47% Gum Arabic
+Percent Reduction in Mouthfeel = [(Control product mouthfeel intensity @ 2.5 min − Test product mouthfeel intensity @ 2.5 min)/Control product mouthfeel intensity @ 2.5 min] × 100

Objective mouthfeel evaluations were made by a professional descriptive panel trained to measure differences in sensory attribute intensities over time. The panel was trained in the industry accepted method of Descriptive Analysis, which uses a universal 15 point line scale and appropriate reference material to quantify intensities of relevant attributes in comestibles.

Evaluations were made by presenting panelists with control and inventive products in a computer generated randomized order in containers marked with only 3-digit random codes. The panel consisted of eight members who performed three replicate evaluations for each sample. The resulting intensity data was statistically analyzed using SAS.

Formulas A and B were compared with formula 1; C and D with 2; E with 3; F with 4; G and H with 5; and, I and J with 6. The results of the panel test show that a significant reduction in mouthfeel effects was noted for the inventive examples upon comparison with the corresponding control.

Example 2

The following flavored, hard boiled candy formulations were prepared and evaluated by an panel skilled in the confectionery arts to show taste acceptability of formulations of the invention. Formulas 7 and 8 were prepared as flavored controls to provide the unsuppressed mouthfeel. Formulas K and L are inventive.

| | 7 | K |
|---|---|---|
| CANDY BASE | 98.1968 | 96.1527 |
| ECHINACEA | 1.7329 | 1.800 |
| SIBERIAN GINSENG | — | 0.9500 |
| PALM KERNEL OIL | — | 1.000 |
| MINT FLAVOR | 0.702 | 0.0973 |

Formula 7 was described as having a strong tingling sensation, almost a burn on the tongue. Formula K demonstrated a reduction of the tingling sensation caused by Echinacea as well as an acceptable suppression of the green grassy note from the Siberian Ginseng present in the formula.

| | 8 | L |
|---|---|---|
| CANDY BASE | 96.6379 | 96.9164 |
| ZINC ACETATE | 0.4372 | 0.4373 |

-continued

|  | 8 | L |
|---|---|---|
| COLOR | 0.0070 | 0.1850 |
| PARTIALLY HYDROGENATED COTTONSEED OIL | — | 1.4954 |
| CHERRY FLAVOR | 2.9678 | 1.1439 |

Formula 8 was found to be very drying and bitter. The drying and bitterness were both perceived to be at a palatable level in formula L.

Example 3

The following flavored, hard boiled candy formulations, containing zinc acetate and partially hydrogenated cottonseed oil, representative of the invention, were prepared and evaluated by a randomly selected panel of consumers. The samples containing the functional ingredients with the partially hydrogenated vegetable oils all met or exceeded acceptance levels.

|  | 1 | 2 | 3 | 4 | 5 | 6 |
|---|---|---|---|---|---|---|
| CANDY BASE | 94.9025 | 95.1425 | 95.4584 | 95.4964 | 95.6791 | 94.8294 |
| ZINC ACETATE | 0.4372 | 0.4372 | 0.4373 | 0.4373 | 0.4372 | 0.4373 |
| PARTIALLY HYDROGENATED COTTONSEED OIL | 1.4954 | 1.4954 | 0.9969 | 0.9969 | 0.9969 | 0.9969 |
| CHERRY FLAVOR | 3.1579 | — | 3.1019 | — | 2.8813 | — |
| MINT FLAVOR | — | 2.9206 | — | 3.0624 | — | 3.7168 |
| COLOR | 0.0070 | 0.0040 | 0.0055 | 0.0070 | 0.0055 | 0.0169 |

We claim:
1. A method for suppressing the unpleasant mouthfeel of a hard boiled candy composition which contains a mineral or mineral salt having an unpleasant mouthfeel, which comprises
   (a) providing a confectionery base containing a mineral or mineral salt having an unpleasant mouthfeel, and,
   (b) adding thereto a material to suppress said unpleasant mouthfeel of said mineral or mineral salt, said material consisting essentially of one or more partially hydrogenated vegetable oils in an amount of from about 0.5% to about 5.0% by weight of said composition said amount being effective to suppress said unpleasant mouthfeel of said mineral or mineral salt.

2. The method according to claim 1 wherein the mineral or mineral salt is zinc, calcium, iron or selenium or a salt thereof.

3. The method according to claim 2 wherein the mineral or mineral salt is zinc or a zinc salt.

4. The method according to claim 1 wherein the partially hydrogenated vegetable oil is cottonseed, soybean, peanut, palm, sunflower seed or corn oil.

5. The method according to claim 4 wherein the partially hydrogenated vegetable oil is partially hydrogenated cottonseed oil.

6. The method according to claim 1 wherein the partially hydrogenated vegetable oil is present at 0.5% to 3.5%.

7. The method according to claim 6 wherein the partially hydrogenated vegetable oil is present at 0.75% to 3.0%.

8. The method according to claim 1 wherein the ratio of the partially hydrogenated vegetable oil to the mineral or mineral salt is from about 1/1 to about 1/0.1.

9. The method according to claim 8 wherein the ratio of the partially hydrogenated vegetable oil to the mineral or mineral salt is from 1.0/0.6 to 1.0/0.15.

* * * * *